(12) United States Patent
Yamamoto et al.

(10) Patent No.: US 10,281,906 B2
(45) Date of Patent: May 7, 2019

(54) MANUFACTURING MANAGEMENT APPARATUS CORRECTING DELAY IN OPERATION OF MANUFACTURING CELL

(71) Applicant: FANUC CORPORATION, Yamanashi (JP)

(72) Inventors: Tomoyuki Yamamoto, Yamanashi (JP); Hiromitsu Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 148 days.

(21) Appl. No.: 15/386,478

(22) Filed: Dec. 21, 2016

(65) Prior Publication Data

US 2017/0185076 A1  Jun. 29, 2017

(30) Foreign Application Priority Data

Dec. 25, 2015  (JP) ................. 2015-254336

(51) Int. Cl.
*G05B 19/418* (2006.01)

(52) U.S. Cl.
CPC ... *G05B 19/4188* (2013.01); *G05B 19/41865* (2013.01); *G05B 2219/31063* (2013.01);
(Continued)

(58) Field of Classification Search
CPC .......... G05B 19/4188; G05B 19/41865; G05B 2219/32243; G05B 2219/32242; G05B 2219/31063; G05B 2219/32256; G05B 2219/32266; G05B 2219/32086; G05B 2219/32252; G05B 2219/31379;
(Continued)

(56) References Cited

U.S. PATENT DOCUMENTS 6,463,360 B1  10/2002  Terada et al.
7,668,614 B2 *  2/2010  Govind ............ G05B 19/41865
                                          700/100
(Continued)

FOREIGN PATENT DOCUMENTS

CN     104062949 A   9/2014
JP      59231601 A  12/1984
(Continued)

OTHER PUBLICATIONS

English Abstract and Machine Translation for Chinese Publication No. 104062949 A, published Sep. 24, 2014, 9 pgs.
(Continued)

*Primary Examiner* — M. N. Von Buhr
(74) *Attorney, Agent, or Firm* — Fredrikson & Byron, P.A.

(57) ABSTRACT

A cell control apparatus controls a plurality of manufacturing cells each including a manufacturing machine. The cell control apparatus comprises an operation extraction part configured to extract a transferable operation which can be performed by a manufacturing cell having operation time to spare among operations of a manufacturing cell having delay in operation. The cell control apparatus commands the manufacturing cell having delay in operation to stop at least a part of operations in the transferable operation and commands the manufacturing cell having the operation time to spare to perform the at least the part of the operations.

2 Claims, 6 Drawing Sheets

(52) U.S. Cl.
CPC ............. *G05B 2219/32242* (2013.01); *G05B 2219/32243* (2013.01); *Y02P 90/20* (2015.11)

(58) Field of Classification Search
CPC .......... G05B 2219/32254; G05B 2219/32328; Y02P 90/20
See application file for complete search history.

(56) References Cited

U.S. PATENT DOCUMENTS

| | | | | |
|---|---|---|---|---|
| 7,904,192 | B2* | 3/2011 | Chua | G06Q 10/06 700/100 |
| 8,428,777 | B1* | 4/2013 | Poursohi | G05B 19/41865 700/247 |
| 9,971,329 | B2* | 5/2018 | Sakakibara | G05B 15/02 |
| 2005/0096957 | A1* | 5/2005 | Bayoumi | G06Q 10/06312 705/7.22 |
| 2009/0149978 | A1* | 6/2009 | Fromherz | G05B 19/4189 700/100 |
| 2010/0217437 | A1* | 8/2010 | Sarh | B25J 9/0084 700/248 |
| 2014/0067108 | A1* | 3/2014 | Pedigo | G05B 19/41865 700/108 |
| 2015/0316925 | A1 | 11/2015 | Frisk | |
| 2017/0031335 | A1* | 2/2017 | Sakakibara | G05B 15/02 |

FOREIGN PATENT DOCUMENTS

| | | | |
|---|---|---|---|
| JP | 4183560 | A | 6/1992 |
| JP | 5265535 | A | 10/1993 |
| JP | 7299680 | A | 11/1995 |
| JP | 92620 | A | 1/1997 |
| JP | 1119852 | A | 1/1999 |
| JP | 2001121461 | A | 5/2001 |
| JP | 2002370679 | A | 12/2002 |
| JP | 3414194 | B2 | 6/2003 |
| JP | 2009142949 | A | 7/2009 |
| JP | 201064198 | A | 3/2010 |
| JP | 5061965 | B2 | 10/2012 |
| JP | 2014182470 | A | 9/2014 |

OTHER PUBLICATIONS

English Abstract and Machine Translation for Japanese Publication No. 11-19852 A, published Jan. 26, 1999, 11 pgs.
English Abstract and Machine Translation for Japanese Publication No. 04-183560 A, published Jun. 30, 1992, 5 pgs.
English Abstract for Japanese Publication No. 2010-064198 A, published Mar. 25, 2010, 1 pg.
English Abstract for Japanese Publication No. 5061965 B2, published Oct. 31, 2012, 2 pgs.
English Abstract for Japanese Publication No. 3414194 B2, published Jun. 9, 2003, 2 pgs.
English Abstract for Japanese Publication No. 07-299680 A, published Nov. 14, 1995, 2 pgs.
English Abstract for Japanese Publication No. 2014-182470 A, published Sep. 29, 2014, 2 pgs.
English Abstract for Japanese Publication No. 2009-142949 A, published Jul. 2, 2009, 2 pgs.
English Abstract for Japanese Publication No. 2002-370679 A, published Dec. 24, 2002, 2 pgs.
English Abstract for Japanese Publication No. 2001-121461 A, published May 8, 2001, 2 pgs.
English Abstract for Japanese Publication No. JPH05-265535 A, published Oct. 15, 1993, 2 pgs.
English Abstract for Japanese Publication No. JPS59-231601 A, published Dec. 26, 1984, 2 pgs.
English Abstract for Japanese Publication No. 09-002620 A, published Jan. 7, 1997, 1 pg.
Untranslated Decision to Grant a Patent mailed by Japan Patent Office (JPO) for Application No. JP 2015-254336, dated Apr. 11, 2017, 3 pages.
English machine translation of Decision to Grant a Patent mailed by Japan Patent Office (JPO) for Application No. JP 2015-254336, dated Apr. 11, 2017, 3 pages.
Untranslated Decision of Refusal mailed by Japan Patent Office (JPO) for Application No. JP 2015-254336, dated Jan. 10, 2017, 3 pages.
English machine translation of Decision of Refusal mailed by Japan Patent Office (JPO) for Application No. JP 2015-254336, dated Jan. 10, 2017, 3 pages.
Untranslated Notification of Reasons for Refusal mailed by Japan Patent Office (JPO) for Application No. JP 2015-254336, dated Jun. 28, 2016, 6 pages.
English machine translation of Notification of Reasons for Refusal mailed by Japan Patent Office (JPO) for Application No. JP 2015-254336, dated Jun. 28, 2016, 6 pages.
Makris, S. et al., "Cooperating Robots for Reconfigurable Assembly Operations: Review and Challenges," Procedia CIRP, vol. 3, 2012, pp. 346-351.

* cited by examiner

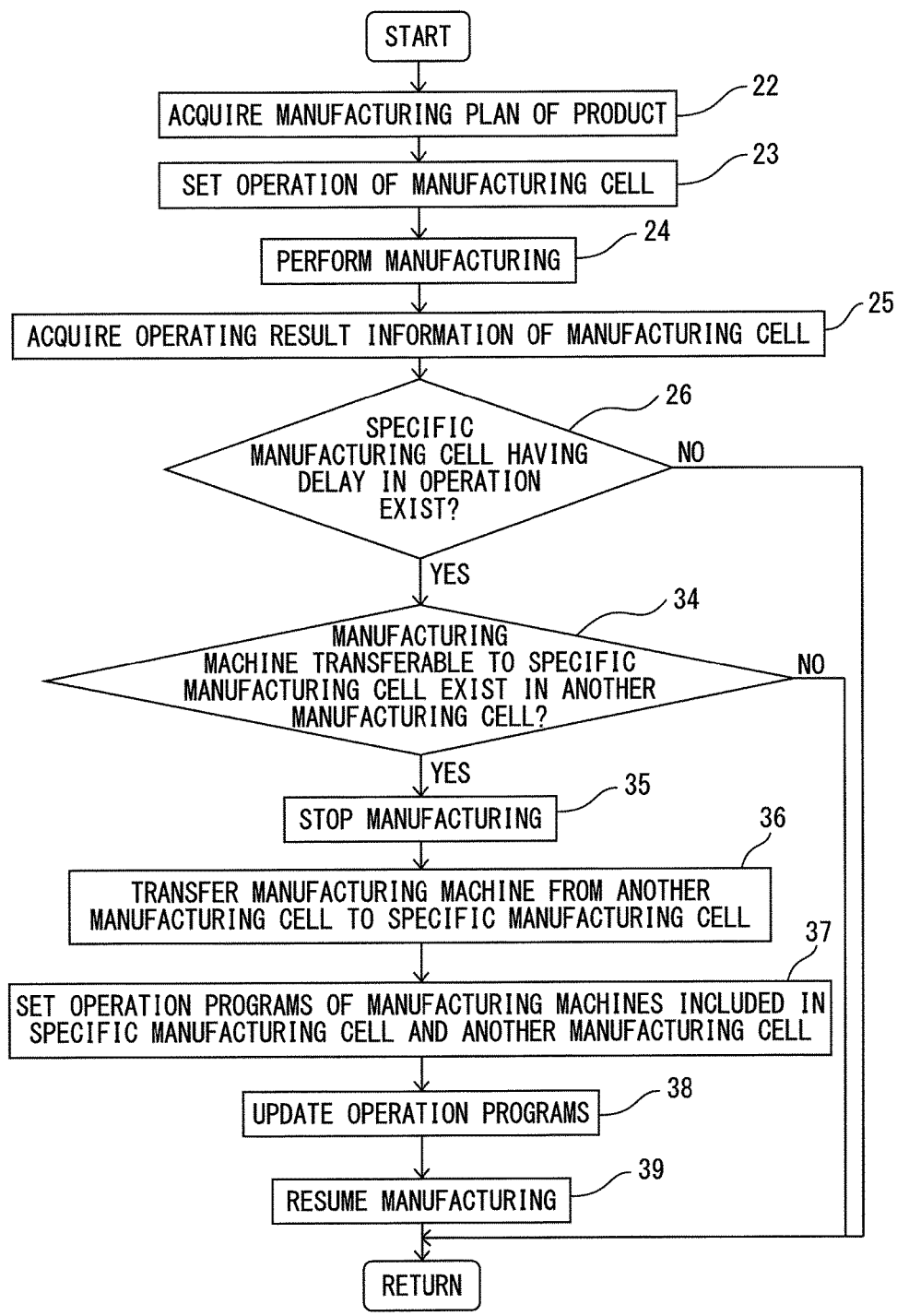

MANUFACTURING MANAGEMENT APPARATUS CORRECTING DELAY IN OPERATION OF MANUFACTURING CELL

BACKGROUND OF THE INVENTION

1. Field of the Invention

The present invention relates to a manufacturing management apparatus for correcting delay in operation of a manufacturing cell.

2. Description of the Related Art

Conventionally, it is known that manufacturing machines machine and weld parts, and thus productivity is improved in a manufacturing factory. Further, it is known that a plurality of manufacturing machines are used for manufacturing products in the manufacturing factory. When a plurality of manufacturing machines are used, the plurality of manufacturing machines share operations in order to manufacture products.

Japanese Patent No. 3414194B discloses an operation distribution method which automates a spot distribution operation of a spot welding robot. In the distribution method, it is disclosed that spots are distributed by a predetermined algorithm using a robot simulation system.

Japanese Patent No. 5061965B discloses a robot production system which can complete a teaching operation in a short time without needing to prepare a dedicated tool. Further, the patent journal discloses that a plurality of robots are installed on a production line and the robots are removed from the production line.

SUMMARY OF THE INVENTION

In a production system including a plurality of manufacturing machines, a plurality of manufacturing cells can be set by dividing manufacturing operations for predetermined operation contents. Each of the manufacturing cells performs a distributed operation. The plurality of the manufacturing cells can be controlled by a manufacturing management apparatus. The manufacturing management apparatus can drive the manufacturing machines so as to manufacture products according to a manufacturing plan of the products.

There are cases in which products are not manufactured according to the manufacturing plan due to a defect of a manufacturing machine and the like. For example, a specific manufacturing cell may take time longer than a planned operation time. Alternatively, an operation speed may be reduced in the specific manufacturing cell due to a breakdown of the manufacturing machine and occurrence of a defect in the manufacturing. In this case, the manufacturing is delayed in the specific manufacturing cell, and another manufacturing cell is in a state in which a waiting time is caused. Accordingly, a problem is caused in which operation efficiency of the production system is reduced. In other words, there is a problem if the speed for manufacturing a predetermined product is reduced.

A manufacturing management apparatus of the present invention is connected to a production planning apparatus for setting a manufacturing plan of a product and controls a plurality of manufacturing cells each including a manufacturing machine. The manufacturing management apparatus comprises a plan reception part configured to receive the manufacturing plan of the product from the production planning apparatus and an operation distribution part configured to set operating plan information including an operation content of the manufacturing cell on the basis of the manufacturing plan. The manufacturing management apparatus comprises an operating information acquisition part configured to acquire operating result information which is information of the manufacturing cell when the manufacturing cell is operated. The manufacturing management apparatus comprises a progress evaluation part configured to extract the manufacturing cell having delay in operation and the manufacturing cell having operation time to spare on the basis of the operating plan information and the operating result information. The manufacturing management apparatus comprises an operation extraction part configured to extract a transferable operation which can be performed by the manufacturing cell having the operation time to spare among operations of the manufacturing cell having the delay in operation. The manufacturing management apparatus comprises an operation command part configured to command the manufacturing cell having the delay in operation to stop at least a part of the operations in the transferable operation and command the manufacturing cell having the operation time to spare to perform at least the part of the operations.

In the above-described invention, the plurality of manufacturing cells can be configured to be able to transfer a manufacturing machine in one manufacturing cell to another manufacturing cell. The manufacturing management apparatus can further comprise a machine extraction part configured to extract a manufacturing machine which can be transferred from the manufacturing cell having the operation time to spare to the manufacturing cell having the delay in operation. The operation command part can transmit a command to transfer the extracted manufacturing machine from the manufacturing cell having the operation time to spare to the manufacturing cell having the delay in operation. Further, the operation command part can transmit a command to cause the transferred manufacturing machine to perform the part of the operations of the manufacturing cell having the delay in operation.

In the above-described invention, the operation command part can transmit an operation program from which at least the part of the operations is removed to a manufacturing machine included in the manufacturing cell having the delay in operation. The operation command part can transmit an operation program to which the at least the part of the operations is added to a manufacturing machine included in the manufacturing cell having the operation time to spare.

Another manufacturing management apparatus of the present invention is connected to a production planning apparatus for setting a manufacturing plan of a product and controls a plurality of manufacturing cells each including a manufacturing machine. The manufacturing management apparatus comprises a plan reception part configured to receive the manufacturing plan of the product from the production planning apparatus and an operation distribution part configured to set operating plan information including an operation content of the manufacturing cell on the basis of the manufacturing plan. The manufacturing management apparatus comprises an operating information acquisition part configured to acquire operating result information which is information of the manufacturing cell when the manufacturing cell is operated. The manufacturing management apparatus comprises a progress evaluation part configured to extract a manufacturing cell having delay in operation and a manufacturing cell having operation time to spare on the basis of the operating plan information and the operating result information and an operation command part configured to transmit an operation command to the manufacturing cell. The plurality of manufacturing cells are configured to be able to transfer a manufacturing machine in one manufacturing cell to another manufacturing cell. The manufacturing management apparatus further comprises a machine extraction part configured to extract a manufacturing machine which can be transferred from the manufacturing cell having the operation time to spare to the manufacturing cell having the delay in operation. The operation command part transmits a command to transfer the extracted manufacturing machine from the manufacturing cell having the operation time to spare to the manufacturing cell having the delay in operation. Further, the operation command part transmits a command to cause the transferred manufacturing machine to perform a part of the operations of the manufacturing cell having the delay in operation.

In the above-described invention, the operation command part can transmit an operation program from which the part of the operations is removed to a manufacturing machine having been arranged in the manufacturing cell having the delay in operation before the manufacturing machine is transferred. The operation command part can transmit an operation program for performing the part of the operations to the transferred manufacturing machine.

BRIEF DESCRIPTION OF THE DRAWINGS

FIG. 6 is a flowchart of the second control of the production system in the embodiment.

DETAILED DESCRIPTION

A manufacturing management apparatus and a production system comprising the manufacturing management apparatus according to an embodiment are described with reference to FIG. 1 to FIG. 6.

Figure 1:
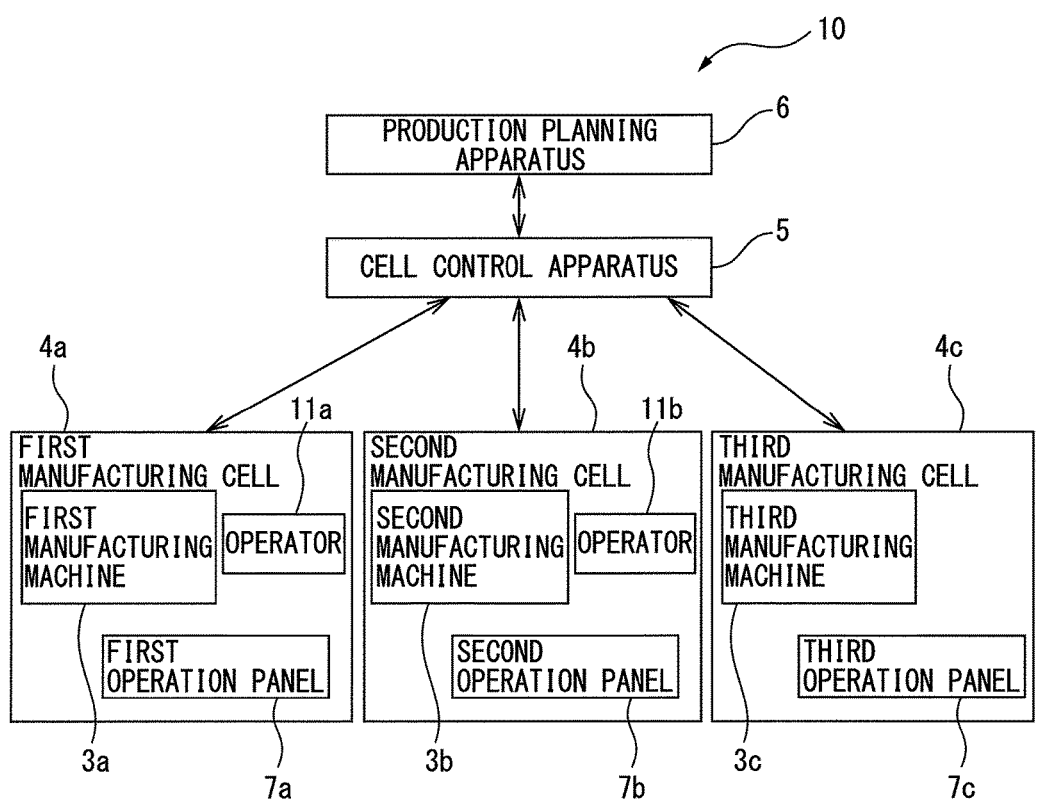
FIG. 1 is a block diagram of a production system in an embodiment.

FIG. 1 is a block diagram of the production system in the present embodiment. A production system 10 comprises a plurality of manufacturing cells 4a, 4b, and 4c. In the example illustrated in FIG. 1, the production system 10 comprises first manufacturing cell 4a, second manufacturing cell 4b, and third manufacturing cell 4c. The manufacturing cell is a group for performing a predetermined operation. The manufacturing cells can be set by an arbitrary method. For example, a single manufacturing cell is set by collecting similar operations. Alternatively, a single manufacturing cell is set by dividing operations so that the operation time becomes a predetermined time length when the operations are arranged in an order of operation steps.

The manufacturing cells 4a, 4b, and 4c each include at least one of a manufacturing machine and an operator. In the present embodiment, the first manufacturing cell 4a includes first manufacturing machine 3a and an operator 11a. Further, the first manufacturing cell 4a is provided with first operation panel 7a. The second manufacturing cell 4b includes second manufacturing machine 3b and an operator 11b. Further, the second manufacturing cell 4b is provided with second operation panel 7b. The third manufacturing cell 4c includes third manufacturing machine 3c. The third manufacturing cell 4c is provided with third operation panel 7c. The manufacturing cells 4a, 4b, and 4c may include a plurality of manufacturing machines or a plurality of operators.

Each of the operation panels 7a, 7b, and 7c includes a display unit for displaying information regarding manufacturing and an operation completion button used by the operator in order to inform completion of operation.

The production system 10 comprises a cell control apparatus 5 serving as a manufacturing management apparatus for controlling the manufacturing cells 4a, 4b, and 4c. The manufacturing machines 3a, 3b, and 3c comprise machine control apparatuses for controlling the manufacturing machines. The cell control apparatus 5 is formed to be able to mutually communicate with the machine control apparatuses. The cell control apparatus 5 acquires operating states of the manufacturing machines 3a, 3b, and 3c from the machine control apparatuses and transmits operating commands to the machine control apparatuses. The cell control apparatus 5 is formed to be able to mutually communicate with the operation panels 7a, 7b, and 7c. The cell control apparatus 5 receives information of operations by the operators 11a and 11b from the operation panels 7a, 7b, and 7c and transmits commands to display predetermined information to the operation panels 7a, 7b, and 7c.

The production system 10 comprises a production planning apparatus 6 for setting a manufacturing plan of a product. The production planning apparatus 6 is formed to be able to communicate with the cell control apparatus 5. The production planning apparatus 6 in the present embodiment manages production of products in an entire factory.

In the present embodiment, the manufacturing cells 4a, 4b, and 4c are installed in the factory where products are manufactured. In contrast, the cell control apparatus 5 and the production planning apparatus 6 may be installed in a building different from the factory. For example, the cell control apparatus 5 may be installed in a different building in a site of the manufacturing factory. In this case, the cell control apparatus 5 and the manufacturing cells 4a, 4b, and 4c can be connected via, for example, a network including an intranet and the like. Further, the production planning apparatus 6 may be installed in an office set up in an area remote from the manufacturing factory. The production planning apparatus 6 can be connected to the cell control apparatus 5 so as to be able to communicate with each other via, for example, a network including an Internet and the like.

Figure 2:
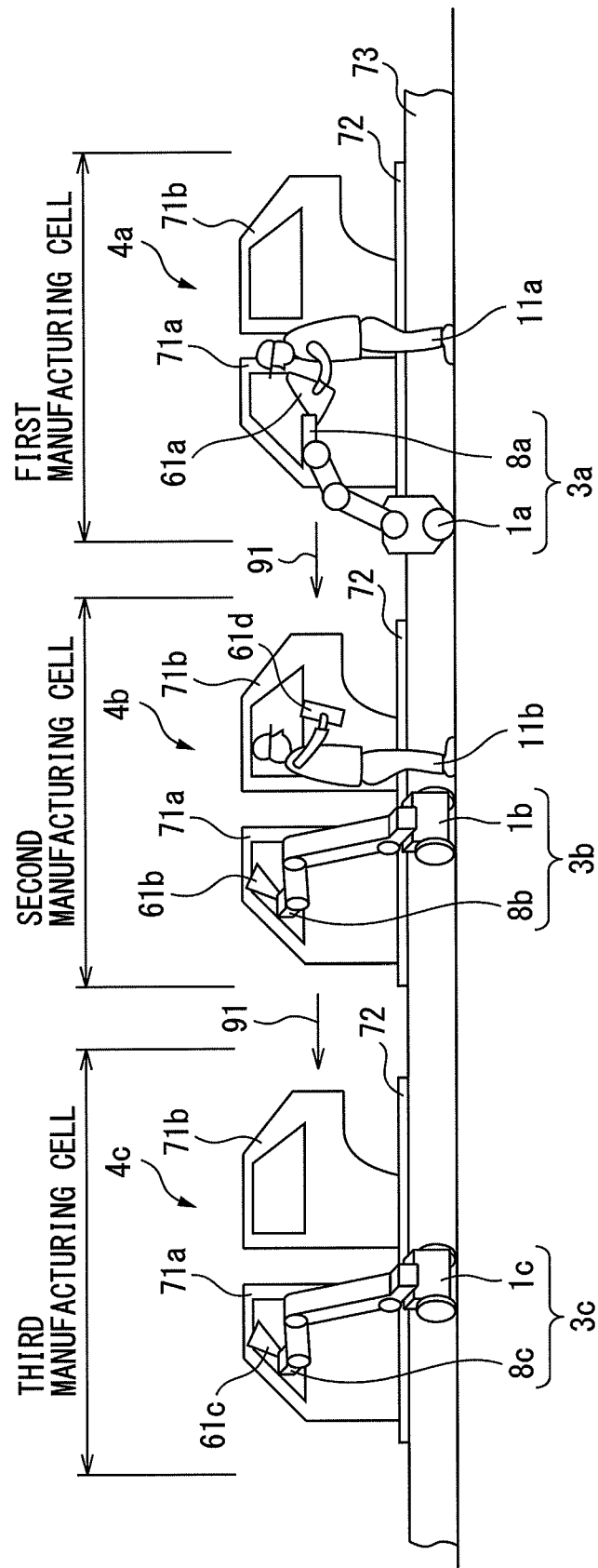
FIG. 2 is a schematic drawing of a manufacturing cell of the production system in the embodiment.

FIG. 2 shows a schematic drawing when operations are performed in the manufacturing cells in the present embodiment. With reference to FIG. 1 and FIG. 2, the operations for attaching components 61a, 61b, and 61c to a front door 71a and a rear door 71b of an automobile are performed in the manufacturing cells 4a, 4b, and 4c in the present embodiment.

The first manufacturing machine 3a includes first robot 1a and first hand 8a. The second manufacturing machine 3b includes second robot 1b and second hand 8b. The third manufacturing machine 3c includes third robot 1c and third hand 8c. The robots 1a, 1b, and 1c in the present embodiment are articulated robots including arms and a plurality of joint units. The hands 8a, 8b, and 8c are formed to be able to hold and release the components 61a, 61b, and 61c. An end effector is not limited to the hand, and an arbitrary device can be connected to the robot according to a desired operation.

In the example illustrated in FIG. 2, in the first manufacturing cell 4a, the first manufacturing machine 3a performs an operation for conveying and passing a large component 61a to the operator 11a. The operator 11a performs an operation for attaching the component 61a to the front door 71a. In the second manufacturing cell 4b, the second manufacturing machine 3b performs an operation for attaching the component 61b to the front door 71a. Further, the operator 11b performs an operation for attaching a component 61d to the rear door 71b. In the third manufacturing cell 4c, the third manufacturing machine 3c attaches the component 61c to the front door 71a. Further, the third manufacturing machine 3c performs an operation for attaching another component to the rear door 71b.

The doors 71a and 71b are supported by a base 72. The base 72 is conveyed by a conveyor 73 as illustrated by an arrow 91. The doors 71a and 71b are conveyed to predetermined positions and stopped. The manufacturing machines 3a, 3b, and 3c and the operators 11a and 11b perform the operations for attaching the components 61a, 61b, and 61c to the doors 71a and 71b. Although it is not illustrated, the production system 10 comprises a hanging tool which moves together with the conveyor 73 and conveys a component to be attached. The components to be attached to the doors 71a and 71b are conveyed together with the doors 71a and 71b.

Figure 3:
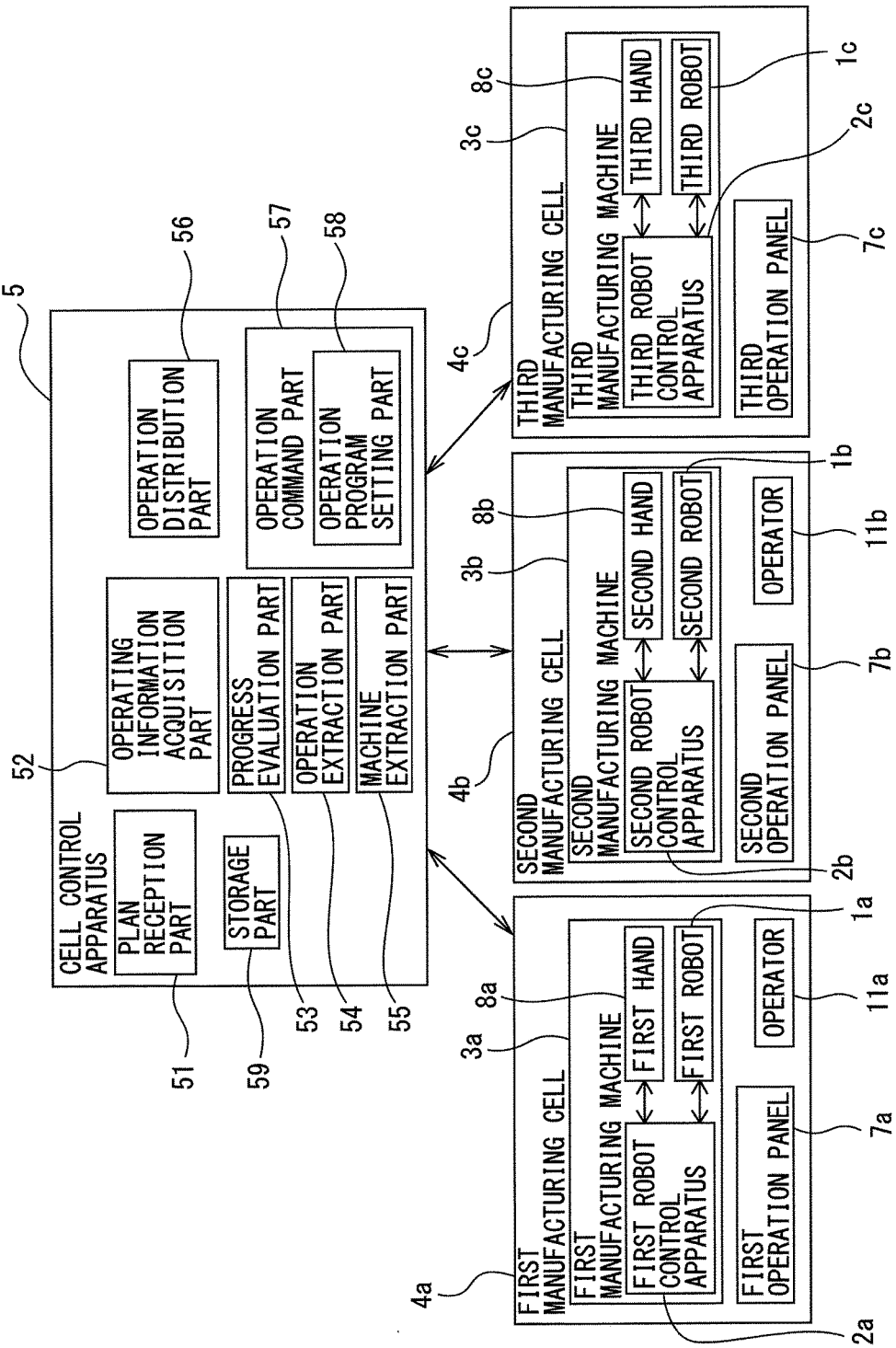
FIG. 3 is a block diagram illustrating a cell control apparatus and a plurality of manufacturing cells in the embodiment.

FIG. 3 shows a block diagram of the cell control apparatus and the manufacturing cells in the present embodiment. With reference to FIG. 1 to FIG. 3, the first manufacturing machine 3a comprises first robot control apparatus 2a for controlling the first robot 1a and the first hand 8a. The second manufacturing machine 3b comprises second robot control apparatus 2b for controlling the second robot 1b and the second hand 8b. The third manufacturing machine 3c comprises third robot control apparatus 2c for controlling the third robot 1c and the third hand 8c.

The robot control apparatuses 2a, 2b, and 2c function as the machine control apparatuses for controlling the respective manufacturing machines. Each of the robot control apparatuses 2a, 2b, and 2c is constituted of an arithmetic processing apparatus including a CPU (Central Processing Unit), a RAM (Random Access Memory), a ROM (Read Only Memory), and the like which are connected with each other via a bus. The first robot control apparatus 2a drives the first robot 1a and the first hand 8a in accordance with first operation program. The second robot control apparatus 2b drives the second robot 1b and the second hand 8b in accordance with second operation program. The third robot control apparatus 2c drives the third robot 1c and the third hand 8c in accordance with third operation program. The cell control apparatus 5 and the production planning apparatus 6 in the present embodiment are also constituted of the arithmetic processing apparatus including the CPU, the RAM, and the like.

The cell control apparatus 5 includes a plan reception part 51 for receiving the manufacturing plan of the product from the production planning apparatus 6 and a storage part 59 for storing the manufacturing plan, the operation programs, and information regarding control, such as operating information of the manufacturing cell. The cell control apparatus 5 comprises an operation distribution part 56 for distributing operations to a plurality of manufacturing cells 4a, 4b, and 4c. Further, the cell control apparatus 5 comprises an operation command part 57 for transmitting operation commands to the manufacturing cells 4a, 4b, and 4c.

Figure 4:
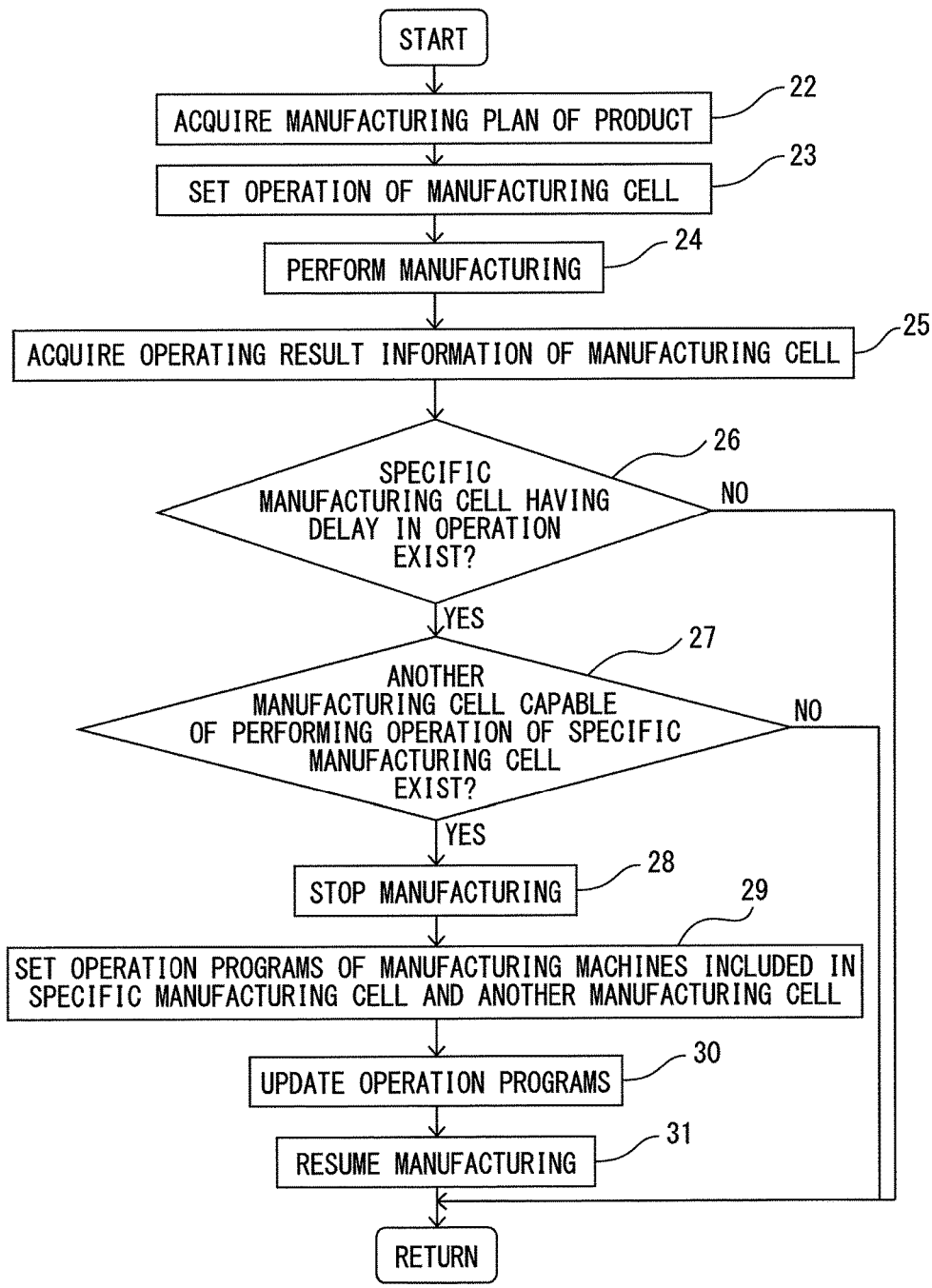
FIG. 4 is a flowchart of first control of the production system in the embodiment.

FIG. 4 shows a flowchart illustrating first control of the production system in the present embodiment. With reference to FIG. 1 to FIG. 4, in step 22, the plan reception part 51 acquires the manufacturing plan of the product from the production planning apparatus 6. The manufacturing plan includes, for example, the manufacturing plan of the entire factory. The manufacturing plan includes the number of products to be manufactured, a predetermined deadline, and the like.

In step 23, the operation distribution part 56 sets the operation of the manufacturing cell on the basis of the manufacturing plan. The operation distribution part 56 generates operating plan information for the respective manufacturing cells 4a, 4b, and 4c. The operating plan information include, for example, operation contents of the manufacturing cells 4a, 4b, and 4c and planned operation time of the respective manufacturing cells 4a, 4b, and 4c.

In step 24, the manufacturing cells 4a, 4b, and 4c perform manufacturing of the products. The operation command part 57 includes an operation program setting part 58 for setting the operation programs to be transmitted to the robot control apparatuses 2a, 2b, and 2c. The storage part 59 stores the operation programs corresponding to the operation contents performed by the manufacturing machines 3a, 3b, and 3c. The operation program setting part 58 selects the operation programs according to the operation contents of the manufacturing machines 3a, 3b, and 3c.

The operation program setting part 58 can set the operation program by arbitrary control without limiting to the above-described configuration. For example, the operation program setting part 58 may be formed to generate operation programs according to the operation contents performed by the respective manufacturing machines.

The operation command part 57 transmits the operation programs to the robot control apparatuses 2a, 2b, and 2c. The robot control apparatuses 2a, 2b, and 2c drive the robots 1a, 1b, and 1c and the hands 8a, 8b, and 8c in accordance with the operation programs. Further, the operation command part 57 transmits to the operation panels 7a, 7b, and 7c commands of operations to be performed by the operators 11a and 11b. The operation panels 7a, 7b, and 7c display the operations to be performed by the operators 11a and 11b on the display units. The operators 11a and 11b perform the operations according to the commands on the display units. As described above, the production system 10 performs the distributed operations in the respective manufacturing cells 4a, 4b, and 4c.

The production system 10 in the present embodiment acquires progress of the operations in the respective manufacturing cells 4a, 4b, and 4c. In the first control, control is performed to transfer at least a part of the operations of the manufacturing cell having delay in operation to another manufacturing cell.

With reference to FIG. 3, the cell control apparatus 5 comprises an operating information acquisition part 52 for acquiring operating result information which is information of the manufacturing cells when the manufacturing cells 4a, 4b, and 4c are operated. The operating information of the manufacturing cells includes the operating plan information and the operating result information. The cell control apparatus 5 comprises a progress evaluation part 53 for extracting the manufacturing cell having the delay in operation and the manufacturing cell having the operation time to spare on the basis of the operating plan information and the operating result information. Further, the cell control apparatus 5 comprises an operation extraction part 54 for extracting a transferable operation which can be performed by the manufacturing cell having the operation time to spare among the operations of the manufacturing cell having the delay in operation.

With reference to FIG. 2 to FIG. 4, in step 25, the operating information acquisition part 52 acquires the operating result information of the respective the manufacturing cells 4a, 4b, and 4c. For example, the operating information acquisition part 52 detects a start time and a completion time of the operation. The operating information acquisition part 52 detects times when the doors 71a and 71b and components to be attached to the doors 71a and 71b as operation objects are brought to the respective manufacturing cells 4a, 4b, and 4c as the start times.

Further, when the operations are completed, the robot control apparatuses 2a, 2b, and 2c transmit signals indicating that the operations are completed to the operating information acquisition part 52. When completing the operations, the operators 11a and 11b press the operation completion buttons on the operation panels 7a and 7b. The operation panels 7a and 7b transmit signals indicating that the operation completion buttons are pressed to the operating information acquisition part 52. The operating information acquisition part 52 can detect times when the operations of the manufacturing machines 3a, 3b, and 3c and the operations of the operators 11a and 11b are completed as the completion times of the operations in the manufacturing cells.

The operating information acquisition part 52 in the present embodiment calculates actual operation time in the respective manufacturing cells 4a, 4b, and 4c on the basis of the start times of the operations and the completion times of the operations. The actual operation time is included in the operating result information. The storage part 59 stores the actual operation time in the respective manufacturing cells 4a, 4b, and 4c.

The control by the operating information acquisition part to detect completion of the operations in the manufacturing cells is not limited to the above-described configuration and arbitrary control can be adopted. For example, in each of the manufacturing cells, an inspection apparatus for inspecting whether or not the operation is normally completed can be installed. The inspection apparatus includes, for example, an imaging apparatus for capturing a product. The inspection apparatus confirms that the operation in the manufacturing cell is normally completed on the basis of an image captured by the imaging apparatus. The operating information acquisition part can detect a time when the inspection apparatus completes the inspection as the completion time of the operation in the manufacturing cell.

Next, in step 26, the progress evaluation part 53 judges whether there is a manufacturing cell having the delay in operation or not. In the present embodiment, the manufacturing cell having the delay in operation is referred to as a specific manufacturing cell. The progress evaluation part 53 acquires the operating result information as the progress of the operations in the respective manufacturing cells 4a, 4b, and 4c. The progress evaluation part 53 acquires the operating plan information of the manufacturing cells 4a, 4b, and 4c generated by the operation distribution part 56. In the individual manufacturing cells 4a, 4b, and 4c, the progress evaluation part 53 compares the operating plan information of the respective manufacturing cells 4a, 4b, and 4c with the operating result information. The progress evaluation part 53 compares, for example, the planned operation time with the actual operation time.

The progress evaluation part 53 can judge that there is the delay in operation when the actual operation time is longer than the planned operation time. The progress evaluation part 53 can judge that the operation time remains when the actual operation time is shorter than the planned operation time, and further a time difference between the actual operation time and the planned operation time is greater than a predetermined judgement value. As described above, the progress evaluation part 53 judges the manufacturing cell having the operation time to spare and the manufacturing cell having the delay in operation.

As the operating plan information and the operating result information, arbitrary information regarding the operation speed in the manufacturing cell can be adopted without limiting to the operation time in the manufacturing cell. For example, the manufacturing cell can be provided with a storage container for temporarily storing a component on which the operation is completed and a measurement apparatus for counting the number of the components disposed in the storage container. The number of the components brought to the storage container in a predetermined time length can be adopted to the operating plan information and the operating result information. For example, the progress evaluation part can judge that there is the delay in operation when the number of the products brought to the storage container in the predetermined time length is less than the planned number of the products.

In step 26, when there is no specific manufacturing cell having the delay in operation, this control is terminated. In step 26, when there is a specific manufacturing cell having the delay in operation, the control is shifted to step 27. In the present embodiment, an example is described in which the operation is delayed in the third manufacturing cell 4c, and the operation time of the first manufacturing cell 4a and the operation time of the second manufacturing cell 4b are left over. The progress evaluation part 53 judges the third manufacturing cell 4c as the specific manufacturing cell having the delay in operation. The progress evaluation part 53 judges the first manufacturing cell 4a and the second manufacturing cell 4b as the manufacturing cells having the operation time to spare.

In step 27, the operation extraction part 54 extracts an operation which can be performed by the manufacturing cells 4a and 4b having the operation time to spare among the operations of the manufacturing cell 4c having the delay in operation. In the present embodiment, an operation which can be transferred is referred to as a transferable operation.

With reference to FIG. 2, the operation extraction part 54 judges that, regarding the first manufacturing cell 4a, the first manufacturing machine 3a and the operator 11a perform the operation in cooperation, so that an operation for attaching a component performed, by the third manufacturing machine 3c cannot be performed. In contrast, the operation extraction part 54 detects that an operation for attaching the component 61c to the front door 71a can be performed by the second manufacturing machine 3b in the second manufacturing cell 4b. The operation extraction part 54 extracts the operation for attaching the component 61c to the front door 71a as the transferable operation. Such an operation which can be transferred between the manufacturing cells can be stored in the storage part 59 in advance.

The operation distribution part 56 determines to transfer the operation for attaching the component 61c to the front door 71a from the third manufacturing cell 4c to the second manufacturing cell 4b. In other words, it is determined that the transferable operation is stopped from being performed by the third manufacturing machine 3c and performed by the second manufacturing machine 3b.

In step 27, when there is no other manufacturing cell which can perform the operation of the specific manufacturing cell, this control is terminated. In other words, a current operation state is continued. In step 27, when there is another manufacturing cell which can perform the operation of the specific manufacturing cell, the control is shifted to step 28. In this example, the control is shifted to step 28.

In step 28, the operation command part 57 commands each of the manufacturing cells 4a, 4b, and 4c to temporarily stop the operation. The manufacturing cells 4a, 4b, and 4c temporarily stop the operations. The stop can be performed when a single operation is completed in all of the manufacturing cells 4a, 4b, and 4c.

In step 29, the operation program setting part 58 of the operation command part 57 sets the third operation program of the third manufacturing machine 3c and the second operation program of the second manufacturing machine 3b after the operation is changed. The operation program setting part 58 sets an operation program from which at least a part of operations is removed to the third manufacturing machine 3c included in the third manufacturing cell 4c having the delay in operation. The operation program setting part 58 sets an operation program to which at least the part of operations is added to the second manufacturing machine 3b included in the second manufacturing cell 4b having the operation time to spare.

In step 30, the operation command part 57 transmits the changed operation programs to the second robot control apparatus 2b and the third robot control apparatus 2c. The second robot control apparatus 2b and the third robot control apparatus 2c update the operation programs.

In step 31, each of the manufacturing cells 4a, 4b, and 4c resumes the operations. The operation command part 57 transmits a command to resume the operations to the manufacturing cells 4a, 4b, and 4c. The third manufacturing machine 3c stops the operation for attaching the component 61c to the front door 71a in accordance with the updated operation program. The third manufacturing machine 3c continues the operation for attaching other components to the rear door 71b. The second manufacturing machine 3b performs the operation for attaching the component 61b and the component 61c to the front door 71a.

As described above, the cell control apparatus in the present embodiment commands the manufacturing cell having the delay in operation not to perform at least a part of the operations in the transferable operation and commands the manufacturing cell having redundant operation time to perform the relevant operation. The cell control apparatus in the present embodiment can reduce a waiting time in the manufacturing cell having the operation time to spare. Further, the manufacturing cell having the delay in operation can correct the delay in operation. Accordingly, the number of products which can be manufactured in a predetermined period can be increased. In other words, the operation efficiency of the production system can be improved.

In the present embodiment, the control for rearranging operations from step 25 for acquiring the operating result information of the manufacturing cell to step 31 for resuming the manufacturing is referred to as operation distribution control.

Next, second control of the production system in the present embodiment is described. In the second control, the manufacturing machine of the manufacturing cell having the operation time to spare is transferred to the manufacturing cell having the delay in operation to perform the operations.

Figure 5:
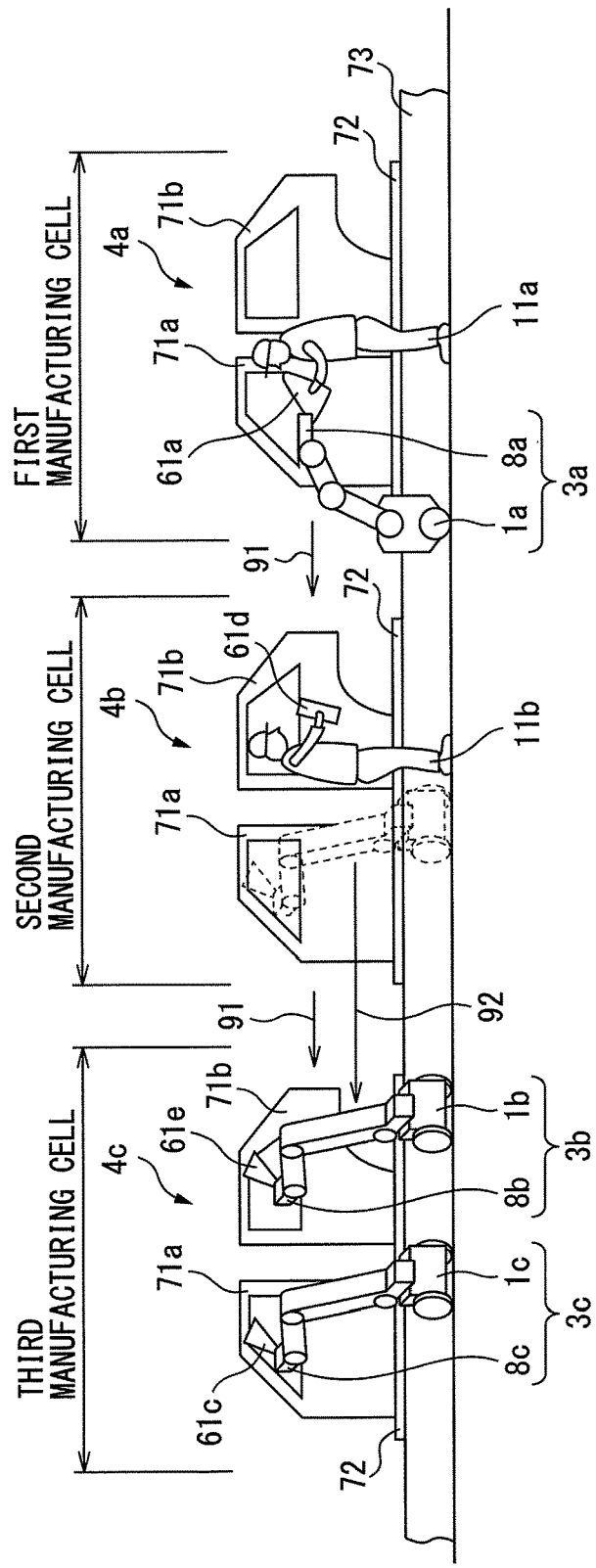
FIG. 5 is a schematic drawing of a manufacturing cell illustrating second control of the production system in the embodiment.

FIG. 5 is a schematic drawing illustrating the second control of the production system in the present embodiment. The production system 10 in the present embodiment is formed so as to be able to transfer a manufacturing machine in one manufacturing cell to another manufacturing cell. Each of the robots 1a, 1b, and 1c in the present embodiment has wheels mounted on a base portion. The robots 1a, 1b, and 1c are formed so as to be transferable, for example, along a mark drawn on a floor surface. The manufacturing machines 3a, 3b, and 3c can be transferred among the manufacturing cells 4a, 4b, and 4c by a command from the operation command part 57.

With reference to FIG. 3, the cell control apparatus 5 in the present embodiment comprises a machine extraction part 55 for extracting the manufacturing machine which can be transferred from the manufacturing cell having the operation time to spare to the manufacturing cell having the delay in operation.

FIG. 6 shows a flowchart of the second control of the production system in the present embodiment. From step 22 to step 26, the control is similar to the above described first control (see FIG. 4). For the second control, an example is described in which the operation is delayed in the third manufacturing cell 4c, and the operation times of the first manufacturing cell 4a and the second manufacturing cell 4b are left over.

In step 26, the progress evaluation part 53 judges the third manufacturing cell 4c as the specific manufacturing cell having the delay in operation. In step 26, when there is the specific manufacturing cell having the delay in operation, the control is shifted to step 34.

In step 34, the machine extraction part 55 extracts a manufacturing machine which can be transferred from the manufacturing cells 4a and 4b having the operation time to spare to the manufacturing cell 4c having the delay in operation. The machine extraction part 55 extracts the manufacturing machine in the other manufacturing cells 4a and 4b which can perform the operation of the manufacturing cell 4c having the delay in operation. Subsequently, the machine extraction part 55 judges whether, when the manufacturing machine is transferred to the manufacturing cell having the delay in operation, the manufacturing cell of which the manufacturing machine is reduced can perform the predetermined operation by the remaining manufacturing machine or the operator. When the remaining manufacturing machine or the operator can perform the predetermined operation, the machine extraction part 55 judges that the manufacturing machine can be transferred. Information of the manufacturing machines which can be transferred among the manufacturing cells and the operations which can be performed by the respective manufacturing machines can be stored in the storage part 59 in advance.

In step 34, when there is no manufacturing machine in the other manufacturing cells which can be transferred to the specific manufacturing cell, the control is terminated. In other words, the manufacturing of the products is continued in the current state as it is. In step 34, when there is a manufacturing machine in the other manufacturing cell which can be transferred to the specific manufacturing cell, the control is shifted to step 35. In the present embodiment, the machine extraction part 55 detects that the second manufacturing machine 3b in the second manufacturing cell 4b can perform the operation of the third manufacturing cell 4c. The machine extraction part 55 detects that the second manufacturing machine 3b can be transferred from the second manufacturing cell 4b to the third manufacturing cell 4c.

The operation distribution part 56 determines to transfer the second manufacturing machine 3b from the second manufacturing cell 4b to the third manufacturing cell 4c. The operation distribution part 56 determines to shift an operation for attaching a component 61e to the rear door 71b from the third manufacturing machine 3c to the second manufacturing machine 3b. Further, the operation distribution part 56 determines that the operator 11b performs the operation for attaching the component 61b to the front door 71a in addition to the operation for attaching the component 61d to the rear door 71b.

In step 35, the operation command part 57 commands each of the manufacturing cells 4a, 4b, and 4c to temporarily stop the operation. The manufacturing cells 4a, 4b, and 4c temporarily stop the operations. The stop can be performed when a single operation is completed in all of the manufacturing cells 4a, 4b, and 4c.

In step 36, the operation command part 57 transmits a command to transfer the extracted manufacturing machine from the other manufacturing cell to the specific manufacturing cell. In the present embodiment, the operation command part 57 transmits a command to the second manufacturing machine 3b to transfer from the second manufacturing cell 4b to the third manufacturing cell 4c. The second manufacturing machine 3b transfers to the third manufacturing cell 4c as illustrated by an arrow 92. When the manufacturing machine is transferred, the operator 11b may manually transfer the second manufacturing machine 3b by looking at a command displayed on the second operation panel 7b.

In step 37, the operation program setting part 58 of the operation command part 57 sets the third operation program of the third manufacturing machine 3c and the second operation program of the second manufacturing machine 3b after the operation is changed.

In step 38, the operation command part 57 transmits the changed operation programs to the second robot control apparatus 2b and the third robot control apparatus 2c. The operation command part 57 transmits an operation program from which a part of the operations is removed to the third manufacturing machine 3c disposed in the third manufacturing cell 4c having the delay in operation before the second manufacturing machine 3b is transferred. The operation command part 57 transmits an operation program for performing the part of the operations to the transferred second manufacturing machine 3b. The second robot control apparatus 2b and the third robot control apparatus 2c update the operation programs. Further, the operation command part 57 transmits a command to be displayed on the second operation panel 7b and cause the operator 11b to attach the component 61b to the front door 71a. The operator 11b confirms a change in the operation contents by looking at the display unit of the second operation panel 7b.

In step 39, each of the manufacturing cells 4a, 4b, and 4c resumes the operation. The operation command part 57 transmits a command to resume the operations to the manufacturing cells 4a, 4b, and 4c. In the third manufacturing cell 4c, the third manufacturing machine 3c stops the operation for attaching the component 61e to the rear door 71b and continues the operation for attaching the component 61c to the front door 71a in accordance with the updated operation program. The second manufacturing machine 3b performs the operation for attaching the component 61e to the rear door 71b. In the second manufacturing cell 4b, the operator 11b performs the operation for attaching the component 61b to the front door 71a and the operation for attaching the component 61d to the rear door 71b.

In the second control in the present embodiment, the manufacturing machine is transferred from the manufacturing cell having redundant the operation time to the manufacturing cell having the delay in operation, and the transferred manufacturing machine can perform at least a part of the operations of the manufacturing cell having the delay in operation. According to the control, the manufacturing cell having the delay in operation can correct the delay in operation, and the manufacturing cell having the operation time to spare can reduce a waiting time. Accordingly, the operation efficiency of the production system is improved.

In the second control illustrated in FIG. 6, the control from step 25 for acquiring the operating result information of the manufacturing cell to step 39 for resuming the manufacturing is referred to as machine transfer control.

The machine transfer control in the second control can be performed in combination with the first control. In other words, the manufacturing machine is transferred from the manufacturing cell having the operation time to spare to the manufacturing cell having the delay in operation, and also the transferred manufacturing machine performs at least a part of the operations of the manufacturing cell having the delay in operation. Further, the manufacturing cell having the delay in operation stops at least a part of the operations in the transferable operation, and the manufacturing cell having the operation time to spare performs the stopped operation. The operation distribution part can set the operation of each of the manufacturing machines on the basis of the operating result information. The operation command part can transmit the operation program according to the operation contents to the manufacturing machine.

Alternatively, the second control can be performed after the first control. More specifically, the machine transfer control in the second control can be performed after the first control. For example, after performing step 31 in the first control in FIG. 4, the control can be performed from step 25 for acquiring the operating result information of the manufacturing cell to step 39 for resuming the manufacturing in FIG. 6.

Further, the first control can be performed after the second control. More specifically, the operation distribution control in the first control can be performed after performing the second control. For example, after performing step 39 in the second control in FIG. 6, the control can be performed from step 25 for acquiring the operating result information of the manufacturing cell to step 31 for resuming the manufacturing in the first control in FIG. 4.

In the above-described embodiments, update of the operation program is performed by the operation command part; however, the update of the operation program can be performed by the operator without limiting to the above-described configuration.

All of the manufacturing machines included in the manufacturing cells in the present embodiment are manufacturing machines for performing attachment of components. The manufacturing machine is not limited to this, and a manufacturing machine performing an arbitrary operation can be adopted. For example, a conveyance machine for conveying a workpiece, a painting machine for painting, a welding machine for welding, a printing machine for printing, and the like can be exemplified as the manufacturing machines. Further, a machine tool can be exemplified as the manufacturing machine. The manufacturing cell can manufacture a predetermined component and the like by cutting a material by the machine tool.

The present invention can provide a manufacturing management apparatus which improves the operation efficiency.

In each of the above-described controls, the order of steps can be appropriately changed within a range in which the functions and actions are not changed. Further, the above-described embodiments can be appropriately combined with each other.

In each of the above-described drawings, same or corresponding portions are denoted by the same reference numerals. The above-described embodiments are illustrative and not intended to limit the present invention. Further, the embodiments include modification of the embodiments described in the claims.

The invention claimed is:

1. A manufacturing management apparatus which is connected to a production planning apparatus for setting a manufacturing plan of a product and controls a plurality of manufacturing cells each including a manufacturing machine, the manufacturing plan including a number of products and a predetermined deadline, the manufacturing management apparatus comprising:
    a plan reception part configured to receive the manufacturing plan of the product from the production planning apparatus;
    an operation distribution part configured to set operating plan information including an operation content of a manufacturing cell on the basis of the manufacturing plan;
    an operating information acquisition part configured to acquire operating result information which is information of the manufacturing cell when the manufacturing cell is operated;
    a progress evaluation part configured to identify the manufacturing cell having delay in operation and the manufacturing cell having operation time to spare with respect to the number of products and the deadline set in the manufacturing plan by comparing the operating plan information and the operating result information; and
    an operation command part configured to transmit an operation command to the manufacturing cell; wherein
    the plurality of manufacturing cells include a manufacturing machine having a wheel so as to be able to transfer from one manufacturing cell to another manufacturing cell,
    the manufacturing management apparatus further comprises a machine extraction part configured to extract the manufacturing machine which can be transferred from the manufacturing cell having the operation time to spare to the manufacturing cell having the delay in operation, and
    the operation command part transmits a command to transfer the extracted manufacturing machine from the manufacturing cell having the operation time to spare to the manufacturing cell having the delay in operation and further transmits a command to cause the transferred manufacturing machine to perform a part of the operations of the manufacturing cell having the delay in operation.

2. The manufacturing management apparatus according to claim 1, wherein the operation command part transmits an operation program from which the part of the operations is removed to the manufacturing machine having been arranged in the manufacturing cell having the delay in operation before a manufacturing machine is transferred and transmits an operation program for performing the part of the operations to the transferred manufacturing machine.

* * * * *